(12) United States Patent
Koski et al.

(10) Patent No.: US 6,668,176 B1
(45) Date of Patent: Dec. 23, 2003

(54) FIXED WIRELESS TERMINAL

(75) Inventors: Vesa J Koski, Oulu (FI); Keijo Keränen, Oulu (FI); Juha T Kinnunen, Oulu (FI); Reijo Teppola, Oulu (FI); Marko Viitamäki, Oulu (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/397,856

(22) Filed: Sep. 17, 1999

(30) Foreign Application Priority Data

Sep. 18, 1998 (GB) ............................................. 9820470

(51) Int. Cl.[7] .............................. H04Q 4/32; H04B 1/40
(52) U.S. Cl. ................. 455/552; 455/553.1; 455/554.1; 455/555; 379/399.01; 379/404; 379/412
(58) Field of Search ......................... 455/552, 555, 455/403, 554, 301, 553.1, 74.1; 379/398, 399.01, 412, 404

(56) References Cited

U.S. PATENT DOCUMENTS

| | | | |
|---|---|---|---|
| 5,966,668 A | * 10/1999 | Lindroth | 455/446 |
| 6,075,499 A | * 6/2000 | Edwards et al. | 343/878 |
| 6,085,080 A | * 7/2000 | Rahikainen et al. | 455/403 |
| 6,125,283 A | * 9/2000 | Kolev et al. | 455/432 |
| 6,269,252 B1 | * 7/2001 | Hutchings et al. | 370/466 |

FOREIGN PATENT DOCUMENTS

| | | | |
|---|---|---|---|
| EP | 0569314 | 11/1993 | |
| EP | 0739148 | 4/1996 | ............ H04Q/7/32 |
| EP | 0781064 | 6/1997 | |
| EP | 0891047 | 1/1999 | |
| GB | 2292047 | 2/1996 | ............ H04Q/7/32 |
| GB | 2316581 | 2/1998 | ............ H04Q/7/32 |
| GB | 2319438 | 5/1998 | ............ H04B/7/18 |
| GB | 2325820 | 12/1998 | |
| WO | 9720445 | 6/1997 | |
| WO | 9809462 | 3/1998 | ............ H04Q/7/32 |
| WO | 9909771 | 2/1999 | |

* cited by examiner

Primary Examiner—Nay Maung
Assistant Examiner—Alan T. Gantt
(74) Attorney, Agent, or Firm—Antonelli, Terry, Stout & Kraus, LLP

(57) ABSTRACT

A fixed wireless terminal such as a wireless local loop terminal comprising: memory (210) storing characteristics for at least one network, means (214, 220) for accepting network information particular to a subscriber and processing means (208) for reading the subscriber network information and, on the basis of the subscriber network information, selecting appropriate network characteristics for subsequent use by the terminal. Preferably the processing means (208) is arranged to configure a subscriber line interface circuit (212) in accordance with the selected appropriate network characteristics, such as ringing tone, dialling tone, busy tone etc.

5 Claims, 4 Drawing Sheets

| SUBSCRIBER NETWORK INFORMATION | NETWORK CHARACTERISTICS |
|---|---|
| MCC = FINLAND<br>MNC = A | DIAL TONE: SEQUENCE = A; LEVEL = -30 TO -2 dB<br>BUSY TONE: SEQUENCE = B; LEVEL = -30 TO -2 dB<br>RINGING TONE: SEQUENCE = C; LEVEL = -30 TO -2 dB<br>ALTERNATE LINE SERVICE = IN USE<br>EMERGENCY SERVICE = 112<br>ON-HOOK DETECTION TIME: a SECS<br>OFF-HOOK DETECTION TIME: b SECS |
| MCC = FINLAND<br>MNC = B | DIAL TONE: SEQUENCE = A; LEVEL = -30 TO -2 dB<br>BUSY TONE: SEQUENCE = B; LEVEL = -30 TO -2 dB<br>RINGING TONE: SEQUENCE = D; LEVEL = -30 TO -2 dB<br>ALTERNATE LINE SERVICE = NOT IN USE<br>EMERGENCY SERVICE = 112<br>ON-HOOK DETECTION TIME: c SECS<br>OFF-HOOK DETECTION TIME: d SECS |
| MCC = UK<br>MNC = GENERIC | DIAL TONE: SEQUENCE = E; LEVEL = -30 TO -2 dB<br>BUSY TONE: SEQUENCE = D; LEVEL = -30 TO -2 dB<br>RINGING TONE: SEQUENCE = F; LEVEL = -30 TO -2 dB<br>ALTERNATE LINE SERVICE = IN USE<br>EMERGENCY SERVICE = 999, 112<br>ON-HOOK DETECTION TIME: a SECS<br>OFF-HOOK DETECTION TIME: d SECS |
| MCC = US<br>MNC = GENERIC | DIAL TONE: SEQUENCE = G; LEVEL = -30 TO -2 dB<br>BUSY TONE: SEQUENCE = B; LEVEL = -30 TO -2 dB<br>RINGING TONE: SEQUENCE = H; LEVEL = -30 TO -2 dB<br>ALTERNATE LINE SERVICE = IN USE<br>EMERGENCY SERVICE = 112<br>ON-HOOK DETECTION TIME: f SECS<br>OFF-HOOK DETECTION TIME: g SECS |

FIG. 3

FIXED WIRELESS TERMINAL

BACKGROUND OF THE INVENTION

This invention relates to telecommunications apparatus for enabling a fixed telecommunication system, adapted for use with a public switched telephone network (PSTN), to operate over a radio telecommunications network. The term "fixed system" as used herein is intended to mean a local system via which a number of communication devices (e.g. telephones, facsimile machines, data devices) normally communicate. The communication devices themselves may be cordless and/or mobile and operate within the area local to the fixed system. The system is fixed from the subscriber's point of view.

In telecommunications, the final drop from the local telephone exchange to a subscriber's terminal or private exchange is known as the "local loop". Traditionally this comprised a network of copper-pair lines, which are expensive to install and to maintain. In densely populated areas and/or countries with low telephone penetration this approach is impracticable. Wireless Local Loop (WLL) is a modern alternative to the copper network. In WLL a wireless (for example radio or infrared) system makes up all or part of the transmission path between the subscriber and the local exchange.

WLL allows the flexible allocation and reallocation of network resources and also has reduced installation time compared with fixed line networks. Thus WLL is particularly suitable for: providing network services quickly to small businesses and residential customers; cutting the cost of the local loop in remote or rural areas; providing telephone services in areas where accelerated development is required by regulatory bodies; and flexibly providing telecommunications services for instance at temporary locations such as exhibitions etc.

WLL typically use microwave, cordless or cellular technologies. In contrast to mobile telecommunications, fixed wireless terminals (or WLL terminals) are fixed and do not act as mobile terminals.

Generally such fixed wireless terminals (such as WLL terminals) comprise a transceiver, an external power supply and an antenna. More particularly a terminal comprises an RF section for receiving and transmitting RF signals via an antenna; an interface for connecting a subscriber device to the wireless local loop terminal; a baseband section for converting received RF signals into baseband signals for transmission to the subscriber device and converting received baseband signals into RF signals for transmission by the RF section; and a subscriber line interface circuit for providing network dependent characteristics e.g. the tones (ringing, dial, engaged (busy) etc.) which, in a fixed network, are conventionally provided by the local exchange. In the context of this specification, ringing tone means the sound a user hears when a device is ringing another number. A ringing generator of the subscriber line interface circuit activates the sound produced by the device to alert a user that an incoming call is being received (commonly referred to as a ring tone). Such a terminal is capable of supporting many forms of transmission, for example speech, fax or data, and has interfaces for connecting to appropriate devices. An example of a known WLL system is described in British Patent Application no. 2311696.

The WLL terminals are fixed terminals i.e. they are not designed to be mobile within the network. The terminals are fixed to the walls in a user's premises, within a cab of a user's lorry, boat etc. or to the walls of buildings for public network coverage. The terminals are usable with a subscriber's device such as a telephone (mobile or otherwise) or a fax machine. An installer or service provider may interact with the terminal via a service handset to find the best place to locate the terminal, make test calls or monitor terminal and radio network parameters.

In known fixed wireless terminals the configuration of the terminal is set at the factory. That is to say that the network characteristics to be used are set at the point of manufacture. A terminal is thus configured in accordance with the intended market. This is undesirable since stockpiling of one type and shortages of another type may occur.

SUMMARY OF THE INVENTION

In accordance with the invention there is provided a wireless terminal comprising memory for storing characteristics for at least one network, means for accepting network information particular to a subscriber, and processing means for reading the subscriber network information and, on the basis of the subscriber network information, selecting appropriate network characteristics for subsequent use by the terminal.

A manufacturer may therefore make a surplus of fixed wireless terminals, each of which is programmed with the network characteristics of the major markets of the manufacturer. The terminal automatically reads the subscriber's information and configures itself in accordance with the subscriber information.

Preferably the terminal also comprises means for accepting a subscriber information memory module having stored thereon the network information particular to the subscriber. Alternatively the terminal may include programmable memory for storing the network information particular to the subscriber. The network information particular to the subscriber may be downloaded via a network or from a subscriber's device.

The processing means may be arranged to configure a subscriber line interface circuit in accordance with the selected appropriate network characteristics.

The terminal may further include an immobilising circuit that immobilises the terminal on detection of tampering with the terminal. Preferably the terminal is arranged to read the network information particular to the subscriber when the immobilser circuit is activated and to prohibit changes to the network characteristics unless the immobiliser circuit is re-initialised by an authorised person.

Preferably the subscriber network information relates to the country in which the subscriber is registered for the provision of mobile services and/or the network operator with whom the subscriber is registered. The stored network characteristics preferably include country and/or network operator details as well as tone sequence information, details of emergency numbers, hook detection times, pulse/TDMF dialling information etc.

The terminal may be arranged to operate according to a required standard e.g. the GSM standard or CDMA. In the case of GSM, preferably the processor is arranged to read at least the mobile country code of the subscriber network information. The processor may also be arranged to read the mobile network code of the subscriber network information.

In accordance with a further aspect of the invention, in a method of configuring a wireless terminal, the method comprises: reading network information particular to a subscriber, comparing said network information with stored information relating to characteristics for at least one network, selecting, on the basis of the subscriber network information, appropriate network characteristics for subsequent use by the terminal; and configuring the terminal in accordance with the selected network characteristics.

A further aspect of the invention relates to apparatus for enabling a telephone system, adapted for use with a public switched telephone network, to operate over a radio telecommunications network, the apparatus comprising a connector for connecting a subscriber device to the apparatus; an antenna for coupling the apparatus to the radio telecommunications network; and a subscriber line interface device including signal generating means for generating a signal to produce a dialling tone on a subscriber device and for generating a signal to cause ringing of the subscriber device on receipt of an incoming call signal from the radio telecommunications system; signal converting means for converting a dialling signal generated by a subscriber device into a code signal for accessing the radio telecommunications network; and detector means for detecting when a subscriber device has been activated to answer an incoming call or making an outgoing call; and control means for reading network information specific to a subscriber and configuring the subscriber line interface device accordingly.

Preferably the apparatus also stores information relating to characteristics for at least one network, and the control means is arranged to compare said subscriber network information with the characteristics for at least one network and to select, on the basis of the subscriber network information, appropriate network characteristics for subsequent use by the apparatus.

In a yet further aspect of the invention, there is provided a method of configuring apparatus for enabling a fixed telephone system, adapted for use with a public switched telephone network, to operate over a radio telecommunications network, the method comprising reading network information particular to a subscriber and configuring network characteristics of the apparatus on the basis of the subscriber network information.

BRIEF DESCRIPTION OF THE DRAWINGS

The invention will now be described by way of example only with reference to the accompanying drawings in which:

FIG. 3 shows an example of network characteristics associated with network information particular to a subscriber.

DETAILED DESCRIPTION OF THE INVENTION

Figure 1:
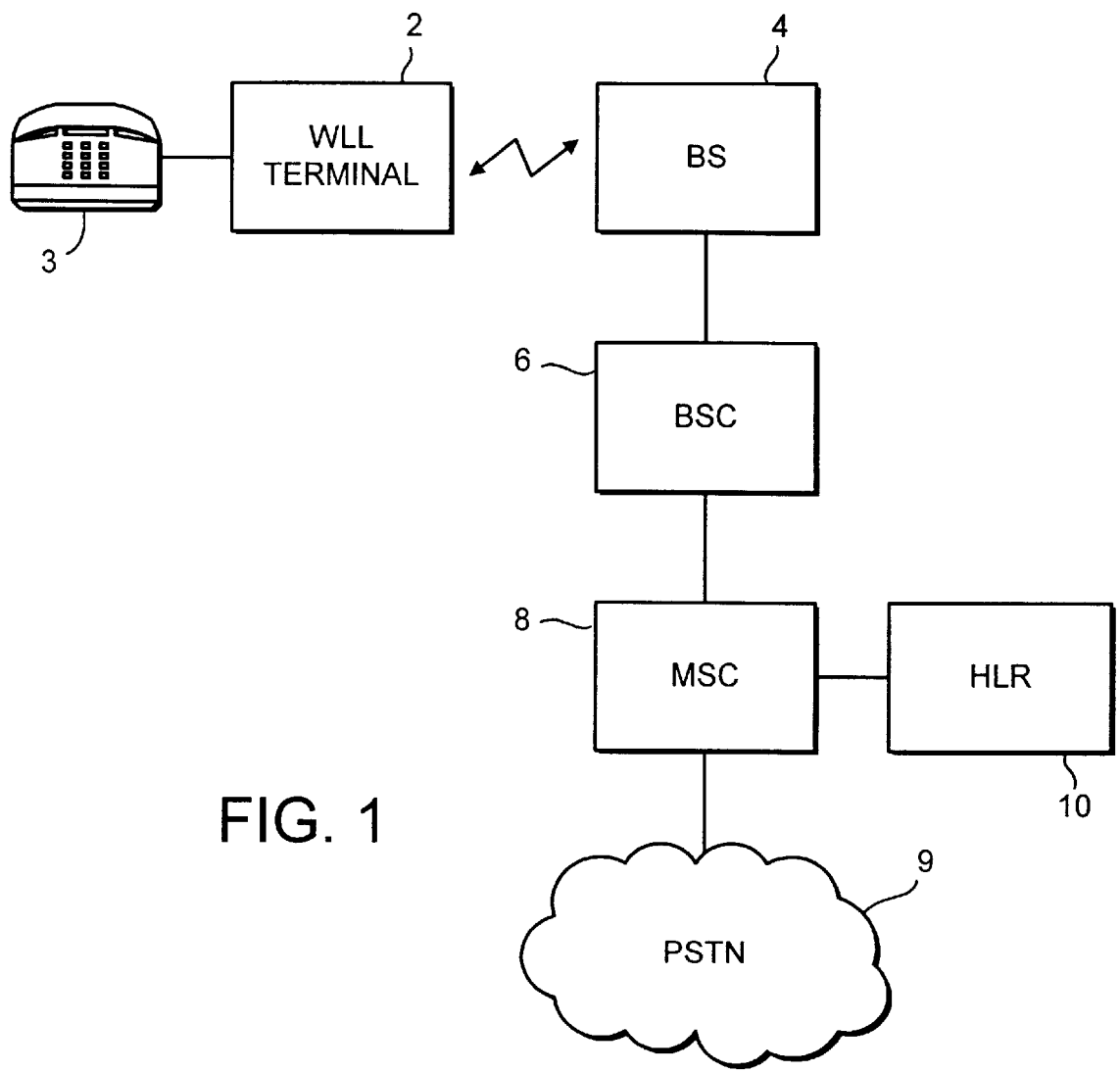
FIG. 1 shows an exemplary arrangement of a wireless local loop and a core network.

FIG. 1 shows the arrangement within a network of apparatus 2 according to the invention. The invention will be described with reference to a wireless local loop terminal. A subscriber device 3 is connected to the WLL terminal 2 either via a fixed connection or via a wireless one. The device 3 may be a conventional fixed-line telephone, a mobile telephone, a facsimile machine, a data generating machine etc. The WLL terminal 2 is connected, via a radio link, to a cellular system that comprises at least one Base Station transceiver (BS) 4. The base stations are connected to a base station controller (BSC) 6 which is further connected to a mobile switching centre (MSC) 8. The switching centre 8 is connected to a core network 9 such as a public switched telephone network (PSTN) or a Public Land Mobile Network (PLMN). Also a home location register 10 is connected to the switching centre 8. Data relating to the subscribers of the system are stored in this register 10.

Figure 2:
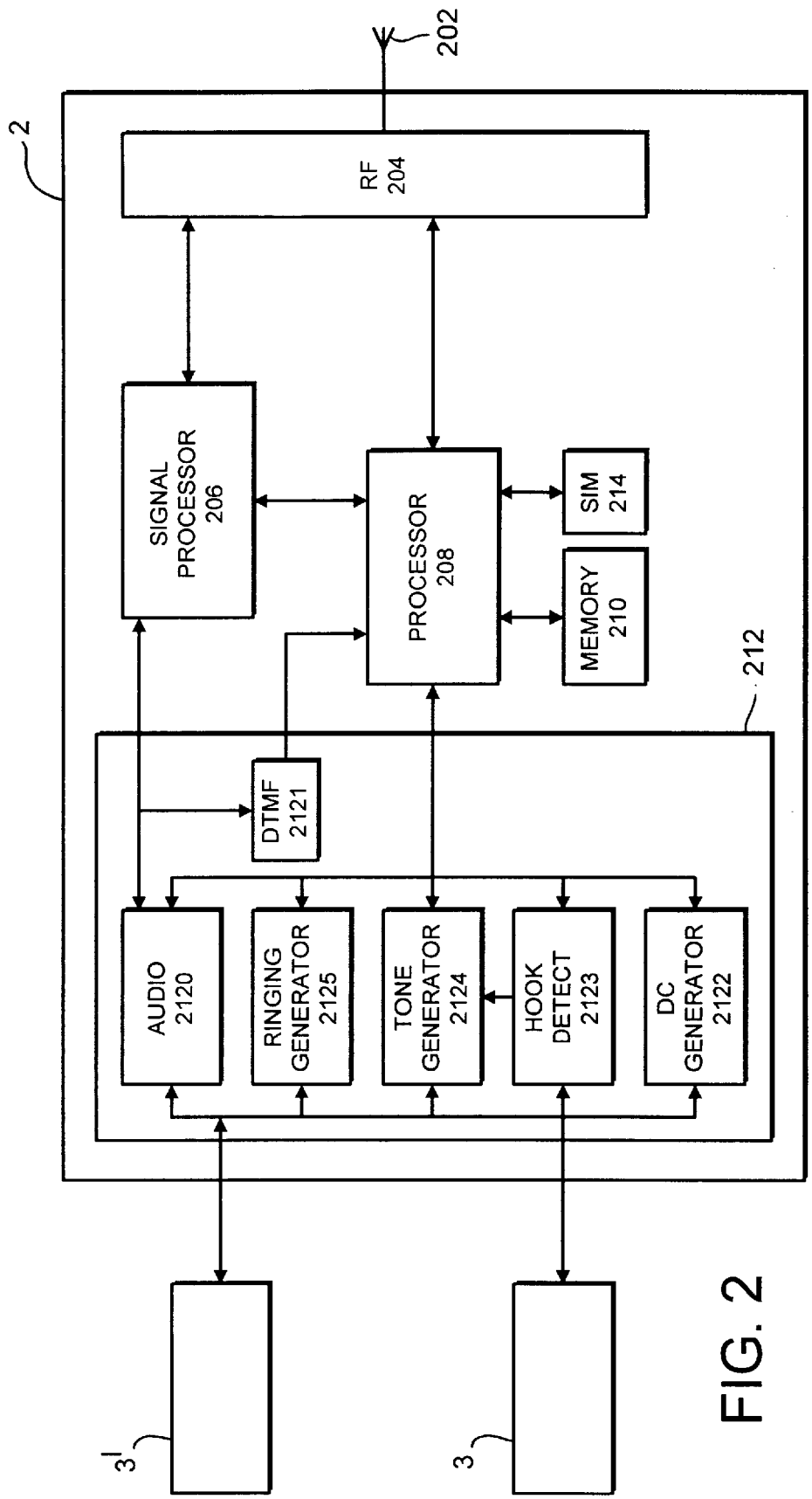
FIG. 2 shows a first embodiment of a wireless local loop terminal according to the invention.

FIG. 2 shows a first embodiment of a terminal 2 according to the invention. The terminal comprises an antenna 202 for transmitting and receiving radio frequency (RF) signals. The antenna is connected to a RF section 204 that amplifies and demodulates a signal received by the antenna into a baseband signal. A signal processor 206 then processes the baseband signal. Similarly the baseband signal to be transmitted is processed by the signal processor 206 according to specifications of the cellular system and modulated and amplified by the RF section 204 for transmission.

A processor 208 controls the signal processor 206 and the RF section 204. A read-only memory (ROM) 210 stores programs and parameters used by the processor. The terminal 2 is supplied with power from an external power supply (not shown) or batteries (not shown) within the terminal. These batteries are generally supplied for back-up during external power supply failure.

A ringing Subscriber Line Interface Circuit (SLIC) 212 supplies the network characteristics e.g. the ringing and supervisory signals that allow a subscriber device 3 to operate with the network i.e. it undertakes some of the functions traditionally carried out by a conventional local exchange. SLICs also deliver analog voice signals and network dependent high-voltage ringing signals. The SLIC also monitors and provides the routine plain-old telephone service (POTS) supervisory signals that, for example, detect dial pulses and ensure that the phone does not ring when the handset is off-hook. Again these signals may differ from network to network e.g. a British ringing tone is two short tones followed by a long break whereas a US ringing tone is a long tone followed by a long break. (SLICs for POTS systems have traditionally been installed on line cards located at the telephone company's central office or local exchange.)

The SLIC provides supervisory signalling, 2-wire analog voice signals, and ringing. Externally, the SLIC connects to one or more subscriber devices 3 via the standard POTS tip and ring 2-wire interface. In particular, the SLIC 212 comprises an audio part 2120 for adapting the audio signals from the signal processor 206 into a form suitable for a subscriber's telephone 3' and vice versa. A DTMF detector 2121 detects dialling signals in the signal from the subscriber device 3 and transmits them to the processor 208. A DC generator 2122 generates a supply voltage for a tone generator 2124. A Hook detector 2123 detects whether the subscriber device is on-hook or off-hook and transmits the status data to the processor 208 and to the tone generator 2124. The tone generator 2124 generates an audible and suitable line tone (dial, ringing, busy, number-unobtainable etc) in accordance with network characteristics set by the processor 208. This tone is transmitted to the subscriber device 3. A ringing signal generator 2125 forms a high voltage ringing signal (for example 45 V AC) for the ringing function of the subscriber device 3. An example of a suitable SLIC is the HC5517 from Harris Corporation.

The processor 208 controls the operation of the SLIC and configures the SLIC with the network characteristics to be used by the SLIC 212 to generate the tones and ringing signals. The processor also sets other parameters of the SLIC e.g. those numbers which indicate that connection to the emergency services is required and which the SLIC is to handle as emergency numbers.

Further description of the WLL terminal will be with respect to GSM standard. However this example is not intended to be limiting and the terminal may be designed for use with any protocol.

In GSM, subscribers are provided with a Subscriber Identity Module (SIM) card that stores subscriber specific information. The subscriber specific information includes an International Mobile Subscriber Identity (IMSI) number that identifies subscribers (for the internal operation of the mobile system). The IMSI consists of a Mobile Country Code (MCC) identifying a country, a Mobile Network code (MNC), identifying a PLMN within the identified country, and a Mobile Subscriber Identification Number (MSIN) identifying a subscriber within this PLMN.

The terminal 2 includes a card holder (not shown) for accepting and holding a SIM card 214 when it is inserted into the terminal. The processor reads network information from the SIM card and uses this information to configure the SLIC 212.

As mentioned, the ROM 210 includes programs and parameters used by the terminal. In particular the ROM includes data relating to characteristics of networks with which the terminal is designed to operate. An example of such characteristics is shown in FIG. 3. In this example the characteristics of four networks are stored; two for Finland (MCC=244), one for the UK (MCC=?) and one for the USA (MCC=?). In Finland two networks are defined: one for operator A and one for operator B. The characteristics stored are:

Dial Tone: sequence & level

Busy Tone: sequence & level

Ringing tone: sequence & level

Alternate line service=In use/Not in use

Emergency service=list of telephone numbers to handle as emergency numbers

On-Hook detection time: a secs

Off-Hook detection time: b secs

This is merely an example of the network characteristics that may be stored in the ROM 210: other characteristics may be stored, in addition or as alternatives.

When a SIM card is inserted into the terminal 2, the processor 208 reads the subscriber's network identification data (i.e. the MCC and MNC) from the SIM card 214 and accesses the ROM 210 in search of corresponding data fields in the ROM. For example, say the SIM card 214 was from a subscriber of a British operator, the IMSI of the card would have MCC=UK; MNC=generic. The processor then searches the ROM 210 for MCC=UK; MNC=generic. Once this entry is found, the processor 208 configures the SLIC 212 with the stored network characteristics for that entry.

Thus the processor 208 configures the SLIC as follows:

Dial Tone: sequence=E; level=−30 to−2 dB

Busy Tone: sequence=D; level=−30 to−2 dB

Ringing tone: sequence=F; level=−30 to−2 dB

Alternate line service=In use

Emergency service=999, 112

On-Hook detection time: a secs

Off-Hook detection time: d secs

The tone generator 2124 is therefore configured to generate a dial tone having characteristics A, a busy tone having characteristics D and a ringing tone having characteristics F.

The hook detector 2123 is configured to detect that the subscriber device is on-hook after a seconds and off-hook after d seconds. The SLIC is also configured such with the emergency services contact numbers so that, if a user dials 112 or 999, these numbers are converted by the SLIC into the standardised code representing emergency services.

A terminal configured in this way will therefore provide a dial tone, a busy tone and a ringing tone which are representative of the UK telephone network and will recognise that, if a user dials 112 or 999, the emergency services are to be contacted. Thus the terminal provides all the network characteristics which are defined by the subscriber network information.

Should the WLL terminal be removed from the subscriber, for instance if the subscriber cancels the contract with the WLL operator, the terminal 2 can be re-configured and re-used for another subscriber. Say that the terminal is to be re-used with a subscriber whose service provider is Finnish operator A. When the WLL operator installs the terminal at the new user's premises and initialises the terminal, the subscriber network information for the new subscriber is read from the SIM card inserted into the terminal. Thus the processor reads the following information from the SIM card 214: MCC=Finland; MNC=A. The processor then searches the ROM 210 for MCC=Finland; MNC=A. Once this entry is found, the processor 208 configures the SLIC 212 with the stored network characteristics for that entry.

Thus the processor 208 configures the SLIC as follows:

Dial Tone: sequence=A; level=−30 to −2 dB

Busy Tone: sequence=B; level=−30 to −2 dB

Ringing tone: sequence=C; level=−30 to −2 dB

Alternate line service=In use

Emergency service=112

On-Hook detection time: a secs

Off-Hook detection time: b secs

Figure 4:
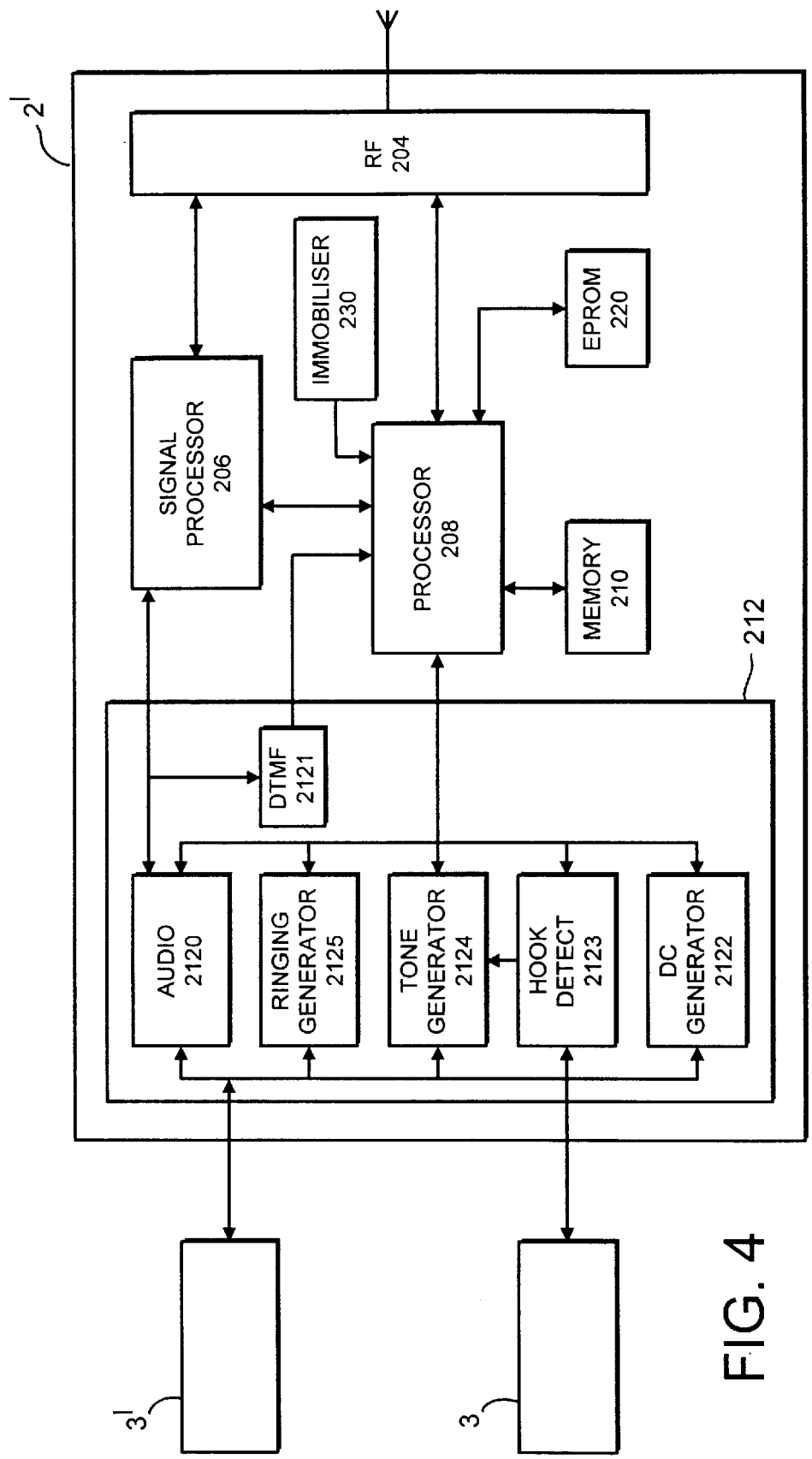
FIG. 4 shows a second embodiment of a wireless local loop terminal according to the invention.

FIG. 4 shows a second embodiment of the invention, in which the subscriber information is not stored on a SIM card but is stored in programmable memory EPROM 220. When an operator installs the terminal and the terminal is initialised, the processor 208 reads the subscriber information from the EPROM and configures the SLIC accordingly. This embodiment is particularly suitable for use with systems, e.g. those based on TDMA, in which the subscriber information is stored permanently in memory rather than on a removable SIM card. The EPROM may be programmed by the WLL operator's personnel when installing the terminal or the terminal may be arranged such that subscriber information can be downloaded to the terminal via the BS 4, BSC 6, and MSC 8 from the HLR 10. Alternatively the terminal may be arranged such that the subscriber information can be downloaded from a subscriber device. Preferably, in either case, the processor 208 is arranged not to allow any further changes to the network characteristics once the terminal has been initialised with subscriber information. This is to prevent fraudulent configuration of the WLL terminal.

Preferably the terminal is also provided with an immobiliser circuit 230. Once an operator installs the terminal, this immobiliser circuit is set. If the terminal is subsequently removed from its mounting, the operation of the WLL terminal 2 is immobilised. This ensures that a subscriber cannot remove the terminal and still continue to use the terminal. Preferably, the terminal is arranged to configure itself on the setting of the immobiliser circuit and, thereafter, to require the operator to reset the terminal before the terminal can be re-configured. In embodiments that use a SIM card, preferably the terminal is arranged to configure itself each time a new SIM card is inserted. However, to prevent fraudulent use of the terminal, resetting of the terminal by an operator should be required before the terminal can be re-configured.

In a third embodiment of the invention, network characteristics are not stored in memory 210 but are provided in full as subscriber specific network characteristics, either read from a SIM card as in the embodiment shown in FIG. 2 or provided to the terminal as described with reference to FIG. 4. This embodiment is not, however, preferred since the subscriber specific network characteristics would them have to include all information relating to dialling tones etc. rather than a central record of this information being stored in the terminal.

In another embodiment the memory 210 is programmable. Thus the manufacturer or operator of the WLL terminal may program the network characteristics. Such a terminal may be manufactured without any network characteristics being stored, the WLL operator programming the network characteristics as required. Alternatively, a WLL terminal manufacturer may program network characteristics for a standard set of networks. The WLL operator can then program any additional network characteristics as required.

The invention has been described with reference to a wireless local loop terminal. This term is not intended to be limiting and the invention is applicable to any wireless terminal which requires or allows network characteristics to be set.

What is claimed is:

1. Apparatus for enabling a telephone system, adapted for use with a public switched telephone network to operate over a radio telecommunications network, the apparatus comprising:

a connector for connecting a subscriber device to the apparatus;

an antenna for coupling the apparatus to the radio telecommunications network; and a subscriber line interface device for providing network dependent characteristics, the subscriber line interface including:

signal generating means for generating a signal to produce a dialing tone on a subscriber device and for generating a signal to cause ringing of the subscriber device on receipt of an incoming call signal from the radio telecommunications system;

signal converting means for converting a dialing signal generated by a subscriber device into a code signal for accessing the radio telecommunications network; and detector means for detecting when a subscriber device has been activated to answer an incoming call or making an outgoing call; and control means for reading network intonation specific to a subscriber and configuring the subscriber line interface device accordingly.

2. Apparatus according to claim 1 further comprising stored information relating to characteristics for at least one network, and wherein the control means is arranged to compare said subscriber network information with the characteristics for at least one network and to select, on the basis of the subscriber network information, appropriate network characteristics for subsequent use by the apparatus.

3. A wireless terminal comprising:

memory for storing characteristics for at least one network;

means for accepting network information particular to a subscriber; and processing means for reading the subscriber network information and, on the basis of the subscriber network information, selecting appropriate network characteristics for subsequent use by the terminal, wherein the processing means is arranged to configure a subscriber line interface circuit in accordance with the selected appropriate network characteristics.

4. The terminal according to claim 3, further comprising means for accepting a subscriber information memory module having stored thereon the network information particular to the subscriber.

5. The terminal according to claim 3, wherein the terminal further comprises an immobilizing circuit which immobilizes the terminal on detection of tempering with the terminal.

* * * * *